US007399079B2

(12) United States Patent
Skuro

(10) Patent No.: US 7,399,079 B2
(45) Date of Patent: Jul. 15, 2008

(54) MANUALLY RETRACTABLE EYEWEAR RETAINER STRAP

(76) Inventor: John Michael Skuro, 2033 Lone Pine Rd., Virginia Beach, VA (US) 23451

( * ) Notice: Subject to any disclaimer, the term of this patent is extended or adjusted under 35 U.S.C. 154(b) by 165 days.

(21) Appl. No.: 11/490,409

(22) Filed: Jul. 19, 2006

(65) Prior Publication Data

US 2007/0236654 A1 Oct. 11, 2007

Related U.S. Application Data

(60) Provisional application No. 60/700,370, filed on Jul. 19, 2005.

(51) Int. Cl.
*G02C 5/20* (2006.01)
*G02C 5/14* (2006.01)

(52) U.S. Cl. ....................... 351/118; 351/113; 351/117; 351/123; 351/156

(58) Field of Classification Search ................. 351/118, 351/113, 117, 156, 111, 41, 158, 119, 123; 2/453
See application file for complete search history.

(56) References Cited

U.S. PATENT DOCUMENTS 4,479,703 A * 10/1984 Enghofer .................... 351/123
6,905,206 B2 * 6/2005 Skuro ......................... 351/118
7,159,978 B2 * 1/2007 Skuro ......................... 351/118

* cited by examiner

*Primary Examiner*—Hung X Dang
(74) *Attorney, Agent, or Firm*—John M. Brandt

(57) ABSTRACT

A mechanism for extending and retracting a retainer strap for eyewear. The strap is disposed in one or both hollow temples of an eyeglass frame and is manually extended, retracted, and locked by an extension which slides in a port or passageway forming a track or slot disposed in one surface of the temple extending from the interior to the exterior of the temple. The extension provides the means to manually retract the strap from an extended position, which extended position is achieved by pulling out the strap from the rearward end, and may be used to form one component of a locking mechanism for the strap either in the extended or retracted position. The retainer straps may be either elastic, inelastic, or one of each to provide for different modes of use.

10 Claims, 3 Drawing Sheets

36b 10 32 22 36a 16
38
40 24 34 38

12 30 10
42
28 24 22
18
16
46
44
16
28 10
30 24
18
12 22

MANUALLY RETRACTABLE EYEWEAR RETAINER STRAP

CROSS REFERENCE TO RELATED APPLICATIONS

This application is based on the disclosure of Provisional Application Ser. No. 60/700,370 filed Jul. 19, 2005, which is hereby incorporated by reference.

BACKGROUND OF THE INVENTION

1. Field of the Invention

The invention relates to devices for securing eyewear to the body of a wearer and more particularly relates to retaining straps and strap retracting arrangements disposed in eyewear temples for holding eyewear in place about the head or neck.

2. Description of the Prior Art

Retaining straps for eyewear or eyeglasses are well known in the prior art. Simple string type retainers having loops at each end to engage eyewear temples are readily available. These devices are usually inelastic and are designed to allow the eyewear to be worn about the neck when removed from the head. Elastic retainers are also sold for use in sports activities to keep the eyewear securely attached to the head. Both of the prior art types of elastic and inelastic retainers are separate units which remain external to the eyewear.

U.S. Pat. No. 4,479,703, Enghofer, discloses a retaining assembly wherein the retaining straps are elastic and retract of there own elasticity into hollow temples. U.S. Pat. No. 6,547,388, Bohn, provides a similar device wherein the retaining strap coils about itself and is adjustable as to effective length by various stop mechanisms.

U.S. Pat. No. 6,905,206, Skuro, provides a retractable assembly for both elastic and inelastic straps so that both an active mode, i.e., secured to the head, and passive mode, for example, around the neck, are available. Additionally, the design of that patent provides for the straps to be completely retracted by an elastic member within the temple when neither form of use is desired.

In contrast to the above described prior art, the use of an elastic retracting member is eliminated from the design and is replaced by a manually operated sliding extension which is accessed through a port or passageway disposed along the longitudinal axis of the hollow temple of a length approximately equal to the amount of retraction desired.

SUMMARY OF THE INVENTION

The invention may be summarized as an alternative retracting arrangement for a retractable retaining strap for head worn eyewear. By eyewear is meant any framelike device which contains, holds, or supports transparent, clear, colored, and/or corrective lens structures, which frame is supported on the head by the use of temples that fit over the ears. Items such as sunglasses, sight correcting eyeglasses, and safety glasses are all included in the class of eyewear for which the invention is appropriate.

As is known in the prior art, the retaining strap retracting mechanism is used in conjunction with a hollow temple in which the strap is disposed. The retracting mechanism of the present invention provides for manual retraction by the use of an extension, which passes through a slot disposed in one side of the hollow temple, the side outermost from the side of the head for example. The extension is attached at or near the end of the strap nearest the frame attachable end of the temple. The strap is extended for use by pulling away from the temple at the end opposite the frame end and retracted into the temple by sliding the extension with a finger toward the frame end. Means are further provided to secure or lock the strap in place within the temple when retracted and also, if desired, when extended. These may, for example, take the form of an assembly with a compressable entrance and exit port to receive and hold the extension.

These, and other features and advantages of the invention will become more evident from the description of the preferred embodiment accompanied by the drawings, which follows.

DESCRIPTION OF THE PREFERRED EMBODIMENT

Figure 1:
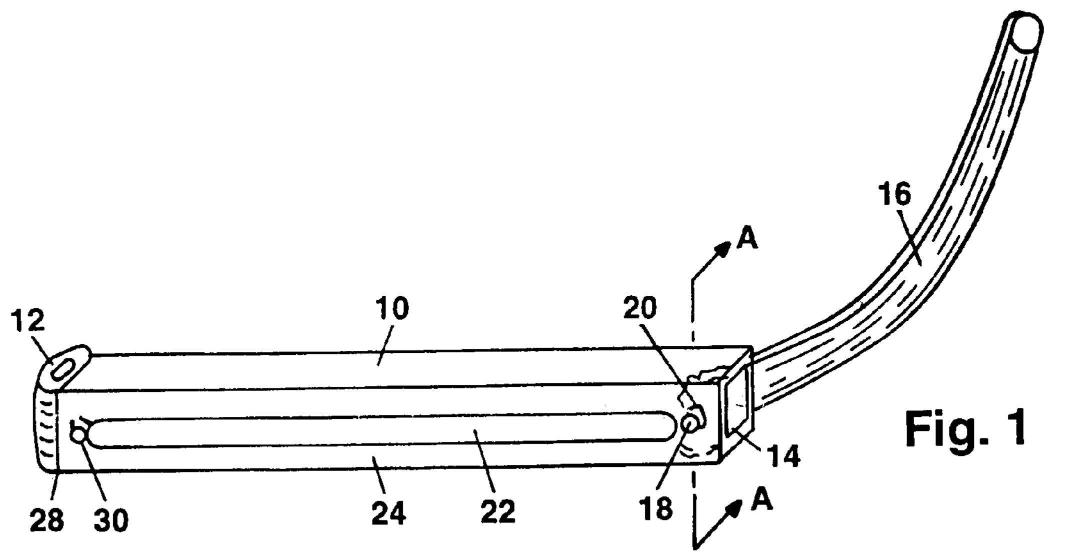
FIG. 1 is a perspective view of the preferred embodiment of the invention.

Referring first to FIG. 1, there is shown a perspective view of the preferred embodiment of the invention comprising a hollow eyewear assembly temple 10 having a frame attachment hinge 12 at one end and a port 14 at the opposite end. Retainer strap 16 is shown as withdrawn from temple 10 and secured in place by means of attached button extension 18 seated in hole 20.

Passageway or slot 22 disposed in wall 24 communicates with the interior 26 of temple 10. Slot 22 allows button 18 to be moved or slid toward the frame attachable end 28 once it is released by depressing it against the bias of strap 16 through hole 20 in wall 24 of temple 10. Button 18 will correspondingly seat and be secured in hole 30 upon complete retraction of strap 16.

Figure 2:
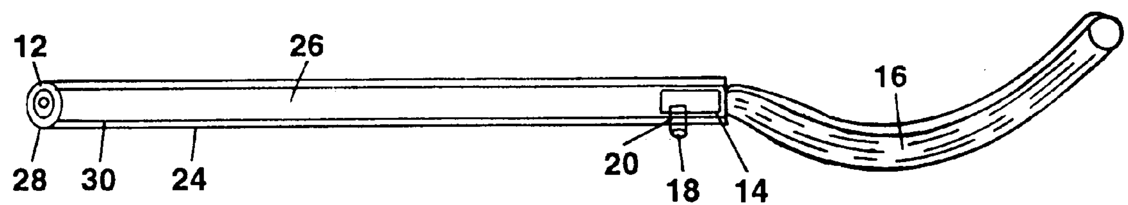
FIG. 2 is a top view of the embodiment of FIG. 1.
Figure 3:
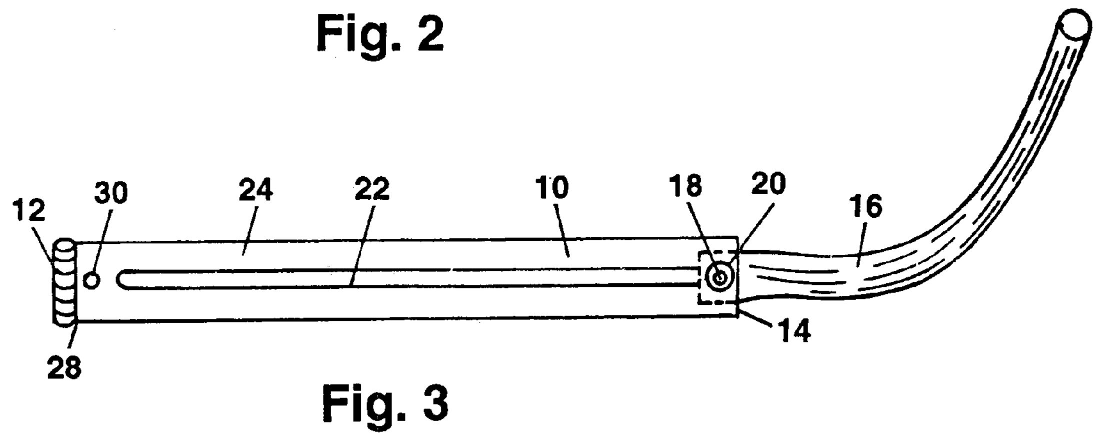
FIG. 3 is a side view of the embodiment of FIG. 1.
Figure 4:
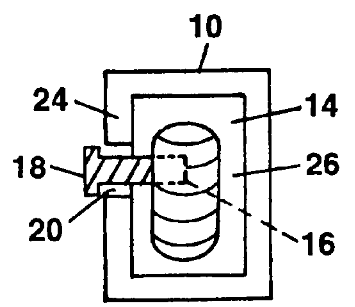
FIG. 4 is a cross-sectional view along line A-A of FIG. 1.

FIGS. 2 and 3 as top and side views of FIG. 1 further illustrate the relationship of the various components of the invention as described above. FIG. 4 is a cross-sectional view showing the manner in which retaining strap 16 fits within hollow temple 10.

FIGS. 5-8 show an alternative arrangement for manually retracting and securing an eyewear retaining strap within a hollow temple. Where appropriate, like numbers refer to like components as described in FIGS. 1-4 above.

In this embodiment, the end of strap 16 is attached to slideable block 32, both of which fit within hollow temple 10. A button or knob extension 34 is attached to block 32 and extends through slot 22 to the exterior of temple 10. A locking assembly 36*a* and 36*b*, formed by a pair of opposed U-shaped flat spring members 38, is disposed one each at each end of temple 10. The extended portions 40 of spring members 38 serve to retain knob 34 unless forced apart by manually sliding knob 34 in one direction or another.

Figure 5:
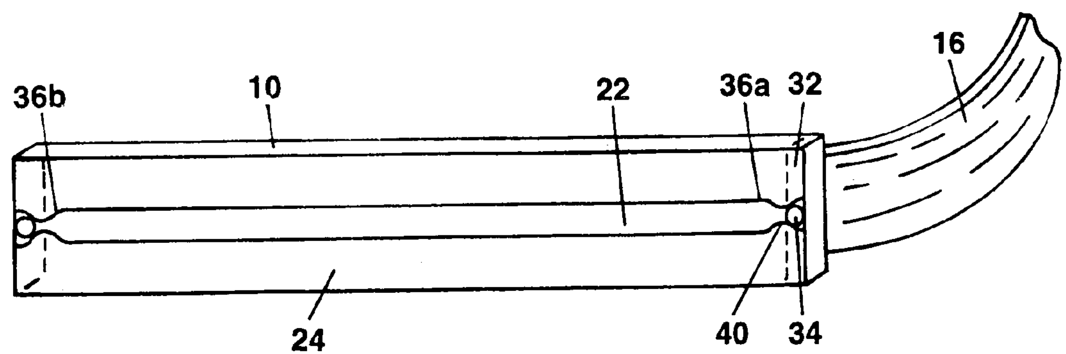
FIG. 5 is a perspective view of an additional preferred embodiment of the invention in a first position of use.
Figure 6:
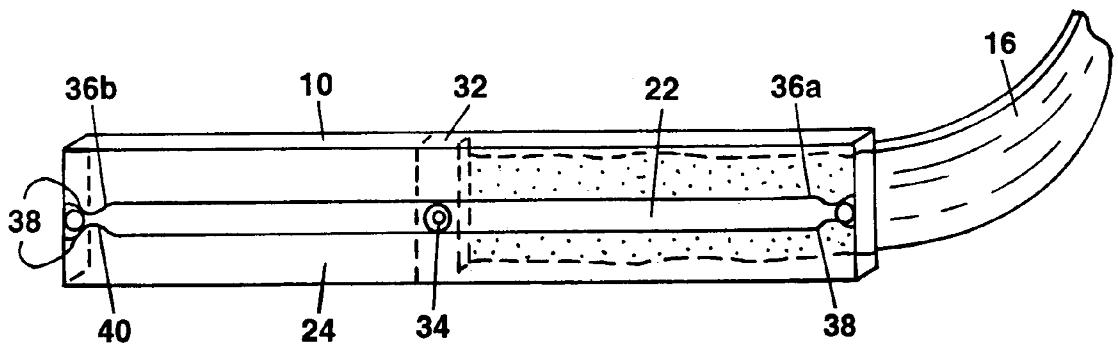
FIG. 6 is a perspective view of the additional preferred embodiment of the invention in a second position of use.
Figure 7:
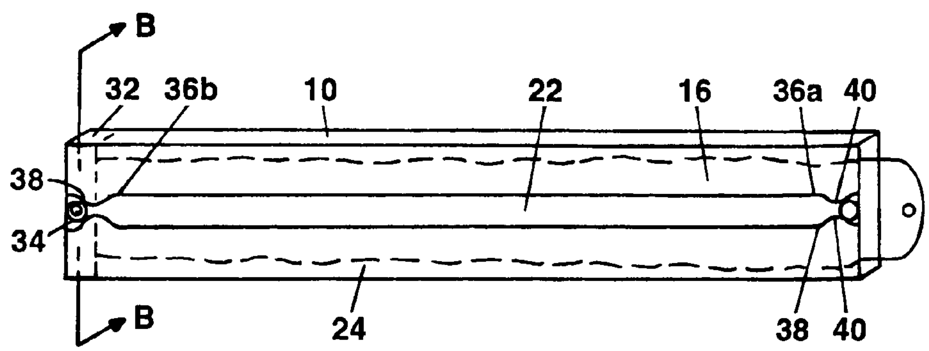
FIG. 7 is a perspective view of the additional preferred embodiment of the invention in a third position of use.

FIG. 5 shows strap 16 fully extended from temple 10 and secured by attached block 32 and button 34 engaging locking assembly 36*a* FIG. 6 shows strap 16 partially retracted, button 34 having been moved rearward through locking assembly 36*a*, and FIG. 7 illustrates the strap completely retracted and secured with button 34 being held by locking assembly 36*b*.

Figure 8:
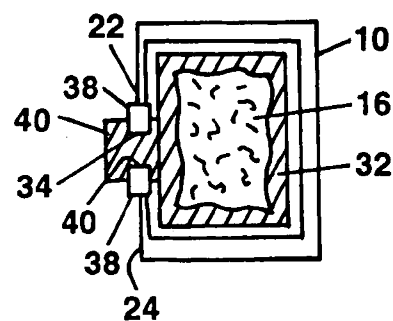
FIG. 8 is a cross-sectional view along lines B-B of FIG. 7.

FIG. 8 is a cross-sectional illustration of the portion of temple 10 including the locking assembly which secures the strap in the retracted position.

Figure 9:
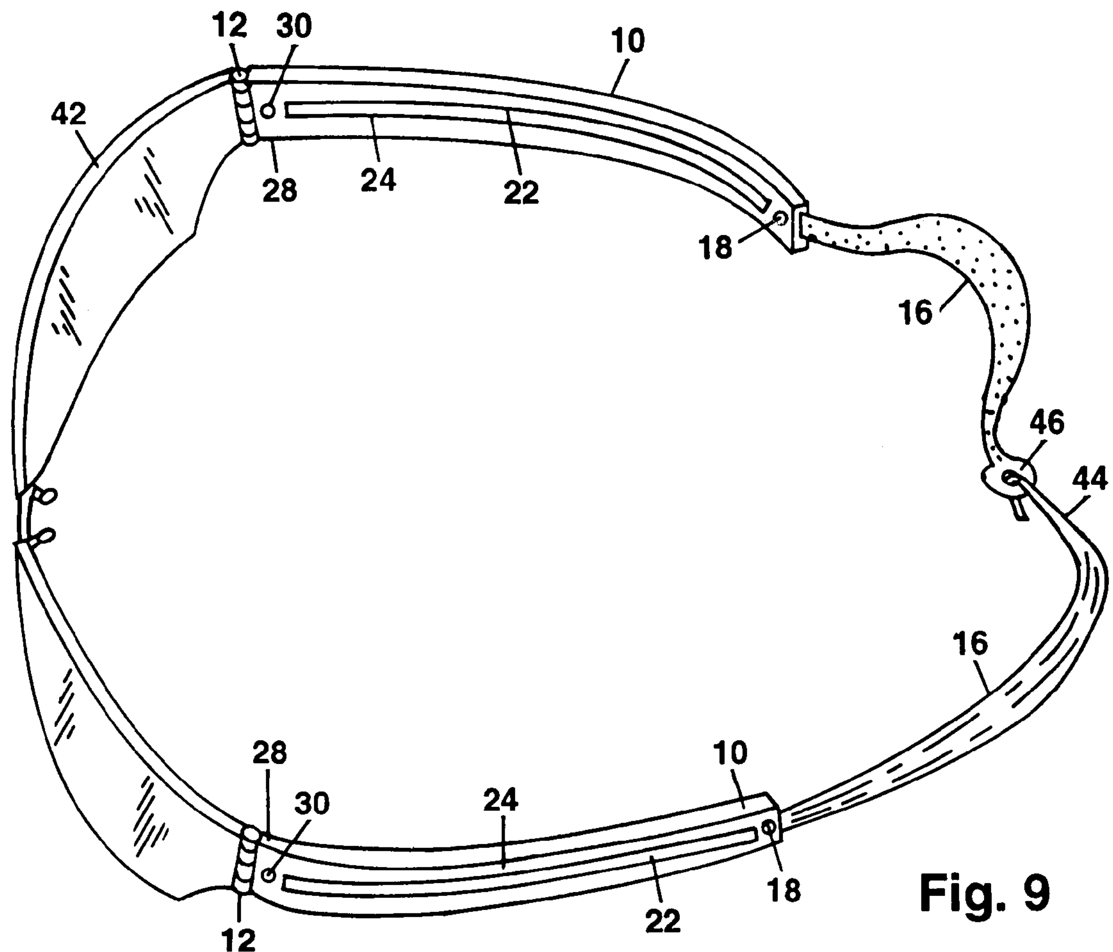
FIG. 9. is a perspective view of the preferred embodiment of the invention as incorporated in a pair of eyewear.

FIG. 9 is provided to show the use of the completed invention employing both an elastic and an inelastic retaining strap in combination in a pair of eyewear 42 utilizing the embodiment of FIGS. 1-4 described above. This illustrates the extension of both straps 16 disposed in opposite temples which straps may be either elastic or inelastic and fastened to each other by, for example, hook 44 and eye 46. Elastic straps facilitate the retention of the eyewear on the head and inelastic straps the retention of the eyewear about the neck.

As variations in the above described preferred embodiment may be made within the general concept of the disclosure, the invention is accordingly defined by the following claims.

What is claimed is:

1. A retractable eyewear retaining strap assembly for an eyewear frame comprising in combination:

A. a hollow temple having a strap receiving end and an eyewear frame attachable end hingeably attachable to said frame, said temple having a longitudinal passageway disposed in one side of said temple, said passageway communicating between the interior and exterior of said temple, said passageway extending substantially the length of said temple;

B. an eyewear retaining strap disposed within said temple, said strap withdrawable from said hollow temple at said strap receiving end;

C. an extension extending through said passageway to the exterior of said temple, said extension connected to said strap and slideable along said passageway;

D. fastening means attached to said eyewear retaining strap, said fastening means attachable to said eyewear, and E. lock means for securing said strap at a selected position within said temple whereby said strap may be withdrawn into and secured within said temple.

2. The assembly of claim 1 further including a block member mounted between said extension and said strap, said block member arranged to slide within said passageway.

3. The assembly of claim 1 wherein said strap is elastic.

4. The assembly of claim 1 wherein said strap is inelastic.

5. The assembly of claim 1 wherein said lock means comprises a pair of U shaped spring members oppositely disposed in said slot at a separation distance arranged to inhibit the passage of said extension along said slot.

6. The assembly of claim 1 further including strap securing means disposed between said strap and said fastening means, said strap securing means arranged to fit into said temple at said strap receiving end.

7. Eyewear comprising in combination:

A. an eyewear frame for containing a pair of lenses;

B. a pair of hollow temples each having a strap receiving end and an eyewear frame attachable end, one each hingeably attached to an opposite side of said eyewear frame at said eyewear frame attachable end, each of said temples having a longitudinal passageway disposed in one side thereof, said passageways communicating between the interior and exterior of said temples, said passageways extending substantially the length of said temples;

C. a strap securing block member slideably disposed within each of said temples, said block members each having an extension extending through said passageways to the exterior of said temples;

D. an eyewear retaining strap disposed within each of said temples and connected one each to each of said block members, said straps withdrawable from said hollow temples at said strap receiving ends;

E. fastening means attached to each of said eyewear retaining straps, said fastening means attachable to one another; and F. lock means for securing each of said block members at a selected position within each of said temples whereby each of said straps may be withdrawn into and secured within said temples.

8. The assembly of claim 7 wherein at least one of said straps is elastic.

9. The assembly of claim 7 wherein at least one of said straps is inelastic.

10. The assembly of claim 7 wherein said lock means comprises a port disposed at least one end of said temple for receiving said extension.

* * * * *